US008712482B2

(12) United States Patent
Sorias et al.

(10) Patent No.: US 8,712,482 B2
(45) Date of Patent: *Apr. 29, 2014

(54) DETACHABLY INTEGRATED BATTERY CHARGER FOR MOBILE CELL PHONES AND LIKE DEVICES

(75) Inventors: Yeoshua Sorias, Brooklyn, NY (US); Max Moskowitz, Kew Gardens Hills, NY (US)

(73) Assignee: Yeoshua Sorias, Brooklyn, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/546,307

(22) Filed: Jul. 11, 2012

(65) Prior Publication Data

US 2013/0178252 A1    Jul. 11, 2013

Related U.S. Application Data

(63) Continuation-in-part of application No. 13/348,066, filed on Jan. 11, 2012.

(51) Int. Cl.
*H04B 1/38* (2006.01)

(52) U.S. Cl.
USPC ............ 455/572; 455/573; 320/111; 320/114

(58) Field of Classification Search
USPC ........ 455/573, 575.1; 320/107, 111, 114–115
See application file for complete search history.

(56) References Cited

U.S. PATENT DOCUMENTS

| 5,628,641 | A | | 5/1997 | Hahn | |
|---|---|---|---|---|---|
| 5,648,712 | A | | 7/1997 | Hahn | |
| 5,780,993 | A | * | 7/1998 | Tsang | ............ 320/111 |
| 5,838,554 | A | | 11/1998 | Lanni | |
| 6,091,611 | A | * | 7/2000 | Lanni | .............. 363/79 |
| 6,184,652 | B1 | | 2/2001 | Yang | |
| 6,191,553 | B1 | * | 2/2001 | Feng-Jung | .............. 320/113 |
| 6,241,538 | B1 | | 6/2001 | Chen | |
| 7,166,987 | B2 | | 1/2007 | Lee et al. | |
| 7,489,952 | B2 | | 2/2009 | Simoes et al. | |
| 2002/0142812 | A1 | * | 10/2002 | Goodman | ........ 455/572 |
| 2004/0036449 | A1 | * | 2/2004 | Bean et al. | ............ 320/166 |
| 2005/0195089 | A1 | * | 9/2005 | Shomali | ........ 340/652 |
| 2011/0159930 | A1 | * | 6/2011 | Garrett et al. | .............. 455/573 |
| 2013/0052871 | A1 | * | 2/2013 | Eklind | ........ 439/620.21 |

OTHER PUBLICATIONS

International Search Report for corresponding International Application No. PCT/US2012/021021 mailed on May 29, 2012.
Office Action mailed Sep. 4, 2013 in corresponding U.S. Appl. No. 13/348,066.

* cited by examiner

*Primary Examiner* — Simon Nguyen
(74) *Attorney, Agent, or Firm* — Ostrolenk Faber LLP

(57) ABSTRACT

A cell phone charger comprises a main body having embedded therein a charging circuit configured to receive line AC voltage and to convert it to a DC voltage suitable for charging the mobile device. AC prongs fold into the body in a stowed position and a connection structure formed integrally with the main body grasps onto and holds the charger secured to the cell phone device. In a preferred embodiment, the AC prongs pivot independently and lie flat against an outside surface of the main body.

15 Claims, 13 Drawing Sheets

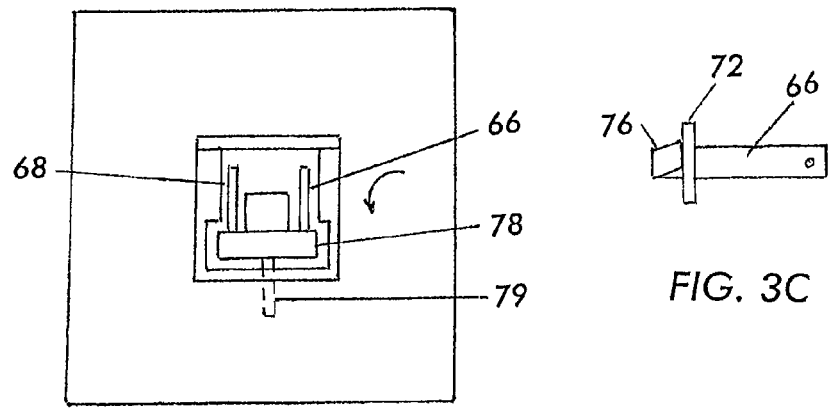
FIG. 3D
FIG. 3C
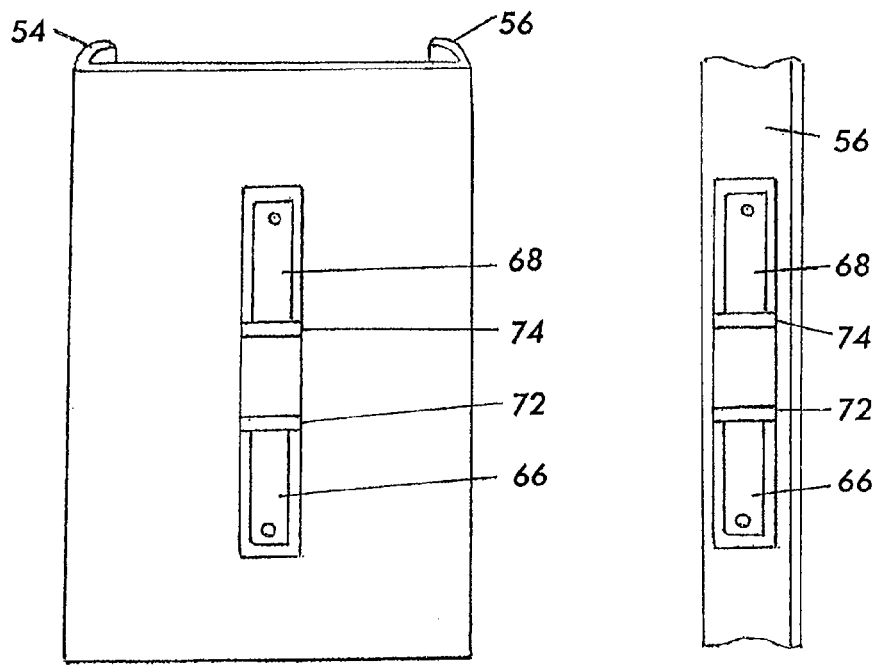
FIG. 3E
FIG. 3F

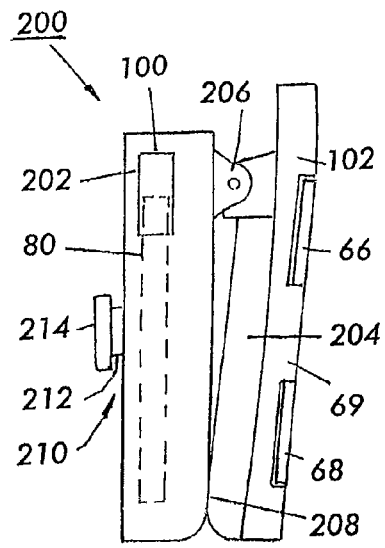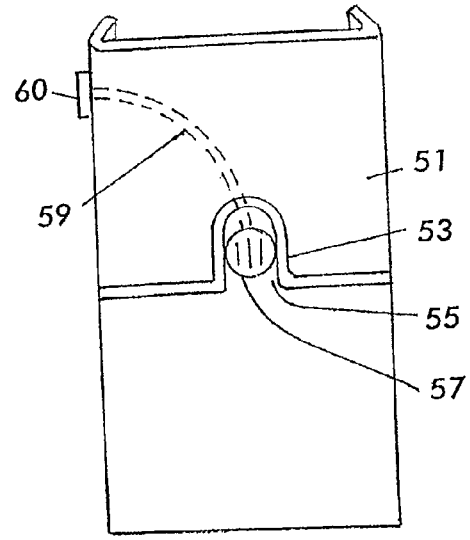
FIG. 9     FIG. 10
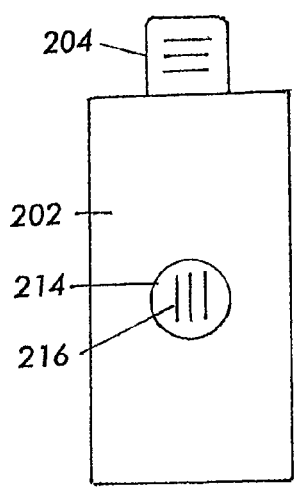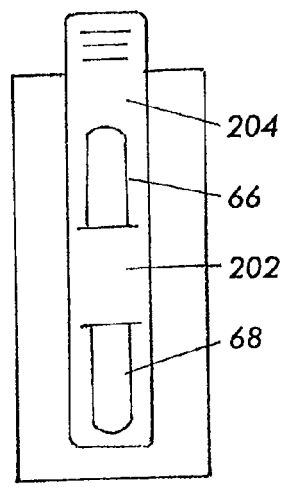
FIG. 9A     FIG. 9B

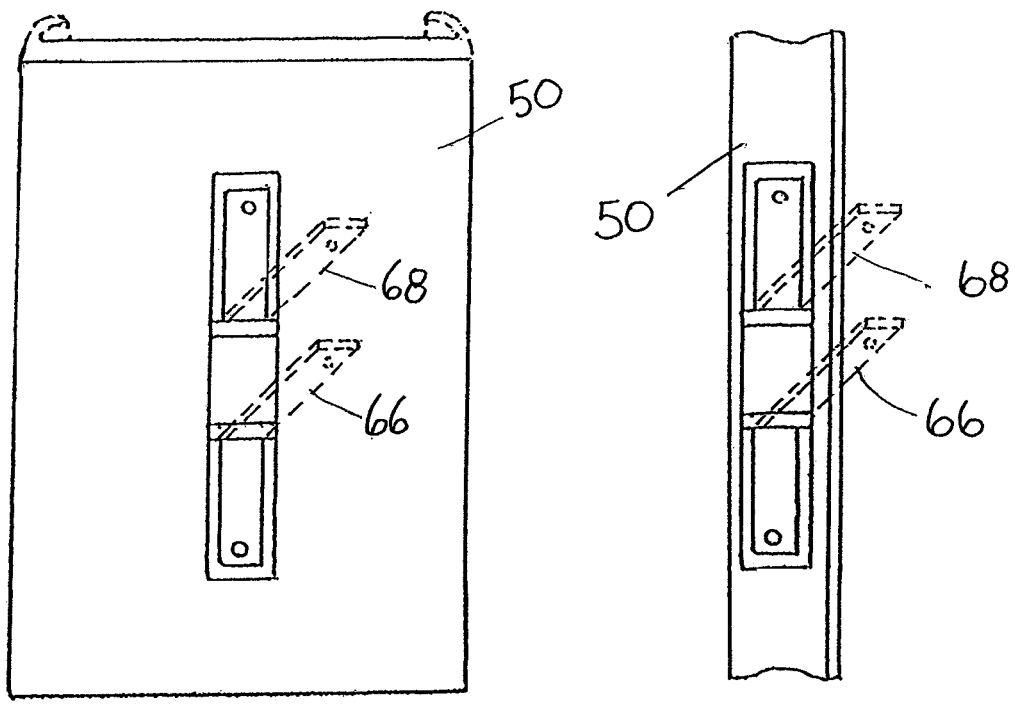

DETACHABLY INTEGRATED BATTERY CHARGER FOR MOBILE CELL PHONES AND LIKE DEVICES

CROSS REFERENCE TO RELATED APPLICATION

The present application is a continuation-in-part of application Ser. No. 13/348,066 filed Jan. 11, 2012 in the names of Yeoshua SORIAS and Max MOSKOWITZ, entitled DETACHABLY INTEGRATED BATTERY CHARGER FOR MOBILE CELL PHONES AND LIKE DEVICES, the contents of which are incorporated by reference herein.

BACKGROUND OF THE INVENTION

The present invention is generally directed to a battery charger and, more particularly, to a battery charger for cell phones and like mobile devices which is constructed to be detachably integrated with the body of the cell phone, with minimal alteration of the cell phone's weight and/or dimensions.

The present invention is rooted in the inspired realization by the present inventors that the explosive and unrelenting adoption by hundreds of millions, if not billions, of people of the cellular cell phone as the primary communication device, requires renewed focus on its charger circuitry and on the method and approach to charging cell phones, PDAs, and mobile communication devices generally.

Personal computing and communication devices such as the familiar cell phone, or the digital communication devices such as the famous Blackberry® and similar devices have been uniquely designed to be hand-held. They generally have a box-like, rectangular shape with a specific height, width and thickness dimensions that vary from device to device. The width of the typical cell phone is generally in the range from 4 to 7 centimeters or even 8 cm, with a height of approximately 10 cm and a thickness on the order of from 7 to 20 mm.

These devices are provided, as a rule, with a charging port in the form of a small connector within a wall socket measuring on the order of 2 to 3 mm in depth and about 7 mm in length. In a typical application, users are provided with separate charging devices, which consist of a charger body from with an AC electrical plug with a pair of prongs that can be inserted into an AC wall socket carrying 115v or 220v, and a long cable which terminates in a diminutive charging plug which can be inserted into the charging socket of the portable cell phone or like device. Such chargers are sometimes provided with a charger body which is designed to fit into an automobile 12 volt (or similar) DC power source, which power source is then converted to a voltage which is compatible with the voltage and current requirements of the particular mobile device.

Carrying around these charging devices is bothersome and annoying. Men typically carry their mobile devices either in their pockets or tethered to their belts. They do not typically lug around bothersome chargers, which they usually keep either on their office desks or at home. With women, the situation is a bit easier because they often carry their portable cell phones in their handbags, which provide more space to also store the battery charger. But the annoyance still remains because the long cable and the charger do not lend themselves to easy and neat keeping in a pocket or in a handbag. All too often, men and women find themselves in situations where their cell phone is about to become fully discharged with no convenient means of charging them.

To the present inventors' knowledge, the prior art has not conceived of and has certainly not provided a means which allows the mobile device to incorporate within its body or be mechanically integrated with a charging device which becomes part of the cell phone, and which allows the electrical plug to be swung out from within the cell phone and to be directly inserted into an 115/220 volt AC wall socket.

SUMMARY OF THE INVENTION

It is an object of the present invention to provide a battery charger for mobile electronic devices which is configured to be detachably attached, in a manner which allows it to become an integrated part of the cell phone itself without unduly increasing the size or overall dimensions of the cell phone device.

It is a further object of the invention to provide battery charger body which is shaped and configured to snap or slide onto the back of a cell phone, hugging the cell phone body tightly, like a bottom cover, and which has integrated therein the charger which adds only a minimal amount to the thickness of the cell phone.

It is yet another object of the invention to provide a same type of charger which can be flush with either the length and width of the cell phone or one which extends from the right side or left side or the top or bottom dimensions of the cell phone and which has an integrated charger therein with an electrical plug that can be swung out from its body in a manner that allows its direct insertion into a conventional electrical AC socket.

The foregoing and other objects of the invention are realized by means of a charger which has a main body with a charging circuit embedded therein, wherein the charging circuit is configured to receive a line AC voltage and to convert it into a DC voltage suitable for charging a mobile device, as well as AC prongs foldable into the main body in a stowed position and pivotable out of the main body in an operable position. A connection structure is formed integrally with the main body in a manner which allows it to extend from the main body and in a configuration which allows the connection structure to grasp onto and hold the charger secured literally integrally to the mobile device for which it is intended. In addition, a charger plug is integrally formed with the charger and located on the charger such as to allow the charger plug to be inserted into a charging port of the mobile device, so that the charger is essentially substantially permanently connected physically and electrically with a mobile device during the use of the mobile device, allowing the AC prongs to be positioned in an operable position for charging a mobile device while the mobile device is in use.

In accordance with other features of the charger, its main body is a generally flat body with a substantially uniform thickness dimension, where the thickness is on the order of 4 to 25 mm, preferably less than about 12 mm or even more preferably less than about 8 mm, as compared with the length and width dimensions, which are on the order of several centimeters, for example, about 5 cm in width and 10 cm in length.

In one embodiment, the connection structure comprises left and right resilient holding panels which grasp the side walls of the mobile device and have large cutouts to avoid obstructing any electrical switches or buttons of the mobile device. Also preferably, the AC prongs are folded along the width or the length, with the thickness dimension of the prongs being received in a trough formed in the main body of the charger so that the prongs penetrate only a distance of 2 or 3 mm into the main body.

In other embodiments, the connection structure is formed as the removable back cover of the mobile device and utilizes the built-in connection mechanism of the mobile device.

Other features and advantages of the present invention will become apparent from the following description of the invention which refers to the accompanying drawings.

BRIEF DESCRIPTION OF THE DRAWINGS

FIG. 3C shows structural details of operation of the prongs.

FIG. 3D shows an alternate embodiment of the folding mode of the AC prongs.

FIG. 3E shows the AC prongs of FIG. 3A, with a vertical orientation.

FIG. 3F shows the AC prongs of FIG. 3E located on the side panel.

FIG. 9 is a schematic of a cell phone belt clip housing a charging circuit.

FIG. 9A is a left side view of FIG. 9.

FIG. 9B is a right side view of FIG. 9.

FIG. 10 shows a cell phone jacket designed to be hooked onto the belt clip of FIG. 9.

FIG. 11 is a further developed view of FIG. 3E.

FIG. 12 is a further developed view of FIG. 3F.

FIG. 27 illustrates a connector designed for signal flow through.

DETAILED DESCRIPTION OF EMBODIMENTS OF THE INVENTION

Figure 1:
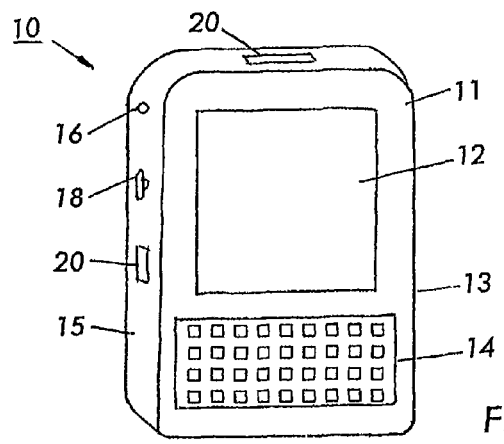
FIG. 1 is a perspective of a typical hand-held mobile communication device, illustrating its overall rectangular shape and comparative dimensions and component layout.

With reference to FIG. 1, shown therein is a conventional, handheld mobile device 10, which may be any cell phone device, such as the now popular iPhone® line of phones, or the phones provided by the many other manufacturers in the field, including the Blackberry®. The communication device 10 of FIG. 1 has a generally rectangular shaped body 11 with dimensions as mentioned before and with a front panel featuring a display 12 and a keyboard 14. Of course, the device 10 may be of the type having a touchscreen, instead of a keyboard. Along the sides are various controls and connectors, including, for example, an audio output connector 16 and an interface circuit which also serves as a charging port 18, and various on/off switches 20 and other controls.

Figure 2:
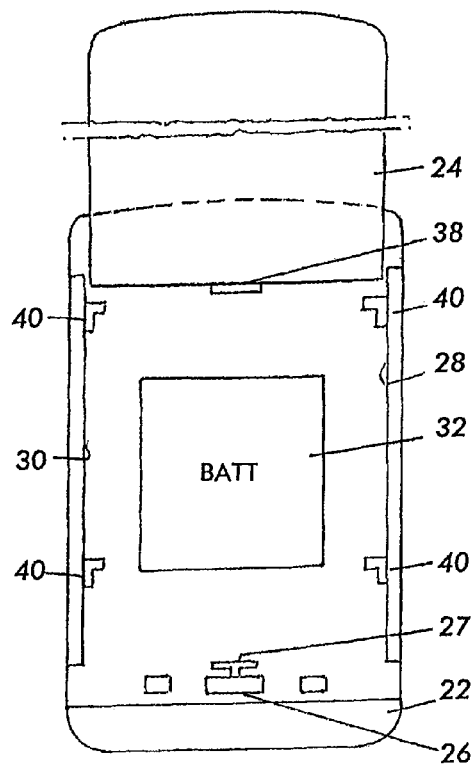
FIG. 2 is a back view of the mobile device of FIG. 1 with cover partially removed, exposing the internal battery and mechanism for attaching the cover.
Figure 2A:
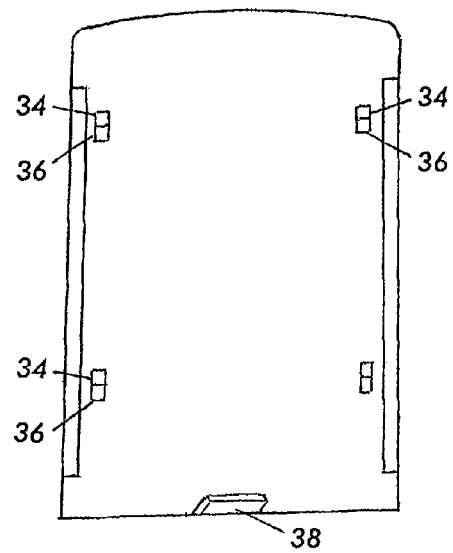
FIG. 2A provides a view of the back side of the cell phone cover of FIG. 2.

Turning to FIG. 2, in typical fashion, the mobile device 10 has a backside 22 with a removable panel or cover 24, which is typically released by pressing a release button 26, which allows the cover 24 to slide in grooved channels 28, 30, to expose a tightly packed compartment, including a battery 32. As is well known and also as shown in both FIG. 2 and FIG. 2A, the backside of the cover 24 has tongues 34 with catches 36, as well as a lock catch 38. When that cover 24 is placed facing down and in registrations with the slots 40 in the main body of the mobile device 10, it fits in and can slide until its catch 38 is caught and locked in the catch bar 27, which bar can be released by pressing the button 26.

Figure 3:
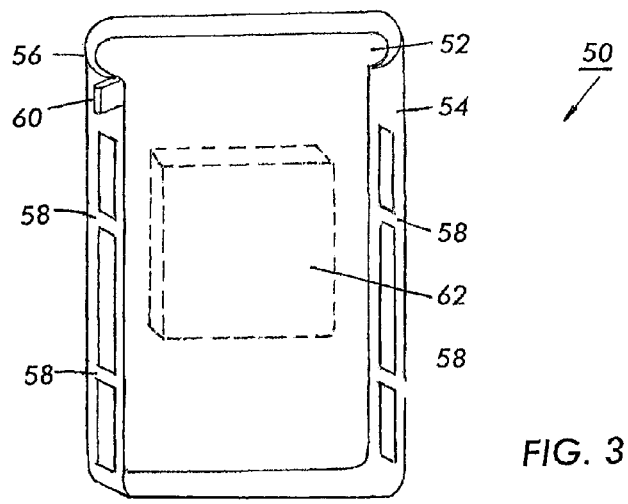
FIG. 3 is a perspective of the present invention showing a cell phone jacket with a main body in which is located a charging circuit and with side panels designed to snap around and hold onto the side walls of the handheld mobile communication device of FIG. 1.

Turning to FIG. 3, in order to avoid tampering with the mobile device 10 (and so possibly compromising warranties and/or to simplify its use), the invention provides a jacket style charger unit 50 which has the general configuration of a jacket with a back panel 52 which has a thickness of several millimeters and in which is embedded the charging circuit described below, or like charging circuits. The generally flat back panel 52 of the charger jacket 50 is flanked by left and right hugging panels 54, 56 which are inwardly curved, resilient and designed to either allow the mobile device 10 to be slid therebetween, or to be forcefully snapped onto the back side of the mobile device 10 and grasp and hold the side walls 13, 15 of the mobile device 10 (FIG. 1). To avoid blocking or obstructing access to the various controls typically found on the sidewalls 13, 15 and along the top of the mobile device 10, the resilient panels 54, 56 are largely cutout and have only several joining ribs for rigidity, which allow full access to the electrical connectors, switches and ports.

Alternatively, instead of the resilient panels, one may use straps, for example, rubber straps by which the charger is held to the phone body.

In addition, the charger jacket 50 of FIG. 3 also has a connector 60 which provides a male plug which routes the charging signals into the charging connector 18 (FIG. 1). In use, the connector 60 is aligned with the socket 18 and then the charger 50 is swung from the other side, whereby a direct connection is made between the charging circuit 62 (described below) and the internal battery 12 of the mobile device 10 for the purposes of the charging thereof.

Figure 3A:
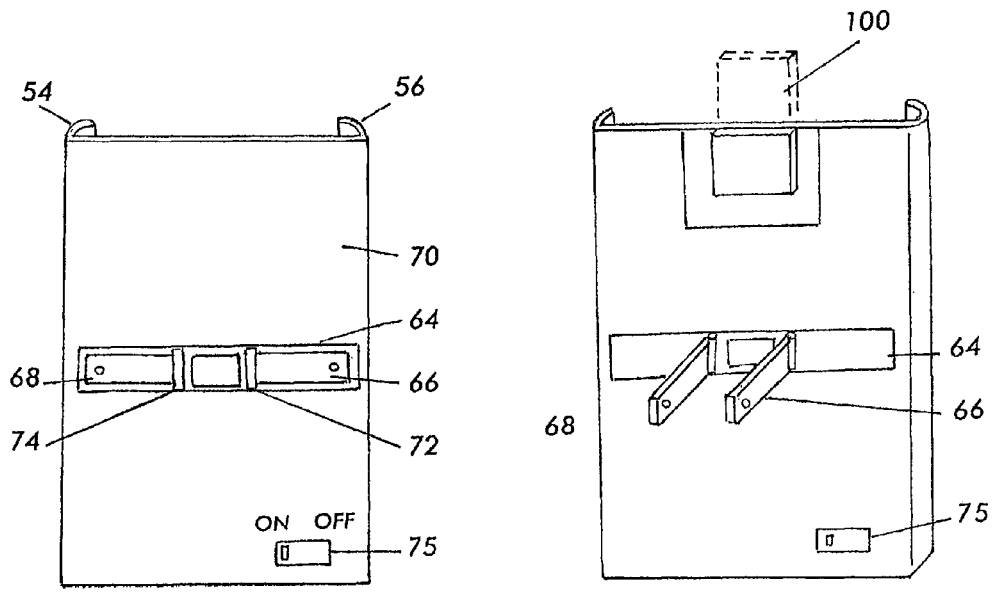
FIG. 3A shows a rear view of the charger jacket of FIG. 1, with AC power prongs folded flush with the back body surface of the charger.

Turning to FIG. 3A, the rear of the charger jacket 10 is shown to have a shallow trough 64 a few millimeters deep, e.g., 2-4 mm, in which lie folded down the righthand side and lefthand side, AC prongs 66, 68 which are mounted inside the trough or recess 64 flush with the outer surface 70. Also shown is a miniature on/off switch 75, whose function shall be described immediately below. Each of the AC prongs 66 and 68, is designed to pivot around a respective longitudinally extending axis 72, 74 at its base, whereby each prong can be swung out from the body and extended out in a manner shown in FIG. 3B. To maintain the prong position perpendicular to the body of the jacket charger 50, a bottom of the prong is shown to have a pointed, generally rectangular, detent 76, which when the prong is swung out, snaps into an underlying recess (not shown) which allows the prong to reliably holds its perpendicular position. The side of the detent 76 also serves to maintain each prong flat against the flat bottom of the trough 64, in the stowed position. As shown, the AC prongs 66, 68 pivot in opposite directions, e.g., to the left and to the right. However, a person of ordinary skill in the art would readily recognize that they can have a length which is equal to approximately the separation therebetween and they both can pivot to the right or both can pivot to the left and a mechanism may be provided to slide a lever that lifts both of them simultaneously and similarly stows both of them simultaneously.

When the jacket charger 50 is mounted on the cell phone 10, it enables the cell phone to be easily carried around and held in one's hand, with only about 5 mm or so being added to the thickness of the mobile device 10, which does not detract from the comfort of carrying the mobile device around, while providing the peace of mind and convenience of being able to recharge the cell phone at any time by simple plugging into any AC wall socket (and while simultaneously even using the device). The detent mechanism 96 of FIG. 3C can be configured so that the distal ends of the prongs are more spaced apart (compared to at the base), but held resiliently in a manner which allows the AC plug to tightly grab the wall AC socket while supporting the weight of the mobile device 10.

In FIG. 3D, the AC prongs 66, 68 are oriented such that their common pivoting axis 78 is coextensive and the width dimension of the prongs fits inside the jacket. In this embodiment, it is naturally so that the thickness of the jacket would be somewhat increased, which in certain embodiments, may not pose or present any drawback. In other words, the two prongs pivot together and their width dimension lies in the thickness dimension of the charger body. Also, as a further alternative, the plug in FIG. 3D is not pivotal within the cutout in the body, but is rather connected to the charging circuit via a short AC cable 79 which measures less than 5 inches, so that the plug can be retrieved and inserted in an AC wall socket in situations where it might be difficult for the body of the charger to lie flush against the wall socket.

In FIG. 3E, the two pivoting axes 72, 74 of the prongs 66, 68 are oriented to extend along the width of the charger jacket 50, with the prongs oriented along the length of the device to provide an even greater space for the prongs, increasing the length thereof where necessary. In FIG. 3F, the prongs, 66, 68 are located on the side panel 56, for increasing ease of connection to an AC wall socket and avoiding entirely covering or obstructing access to said wall power socket.

Figure 4:
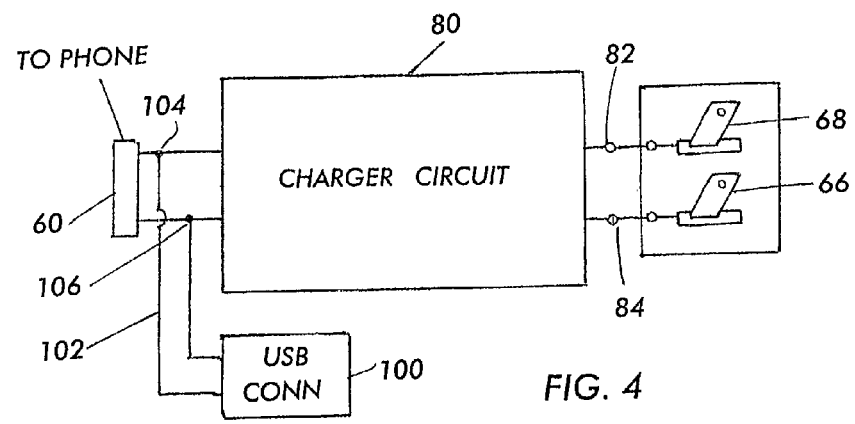
FIG. 4 is a circuit and layout diagram of the charging circuit of the present invention.
Figure 4A:
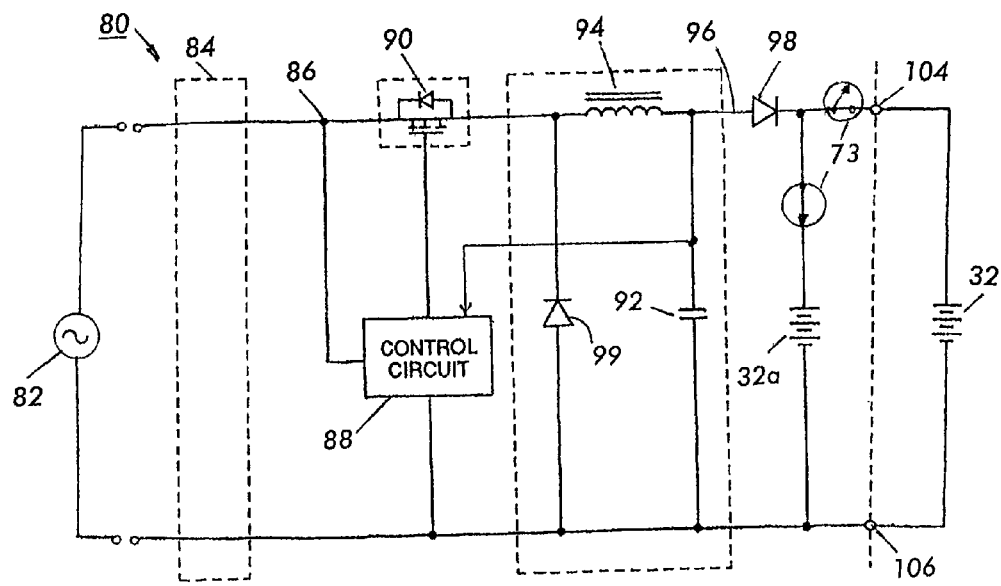
FIGS. 4A and 4B provide examples of internal circuits of the charging circuit.

Turning to FIG. 4, shown therein is the typical arrangement, whereby a charging circuit 80, such as shown in FIG. 4A, is embedded in the back panel of the charger 50, and connected at one end to terminals 82, 84 for receiving the hot and ground terminal inputs from the AC prongs 66, 68 previously described and for outputting at the other end thereof, a DC voltage at plug 60, which voltage is slightly higher than the battery's 32 nominal voltage, in order to effect the charging function, in well known fashion.

FIG. 4A illustrates a typical prior art design of a charging circuit 80. Thus, the AC input 82 can be provided to a circuit block 84 which may represent either, according to one design, just a connector block, or, according to another design, a rectifying circuit, which could be a half wave or a full wave AC rectifier, to produce a positive voltage at the input 86 into the control circuit 88. In accordance with another embodiment, the block 14 represents a transformer which steps down the 115 or 220 volt AC input to a lower magnitude AC voltage suitable for the charging circuit 80, via a diode (not shown).

Figure 4B:
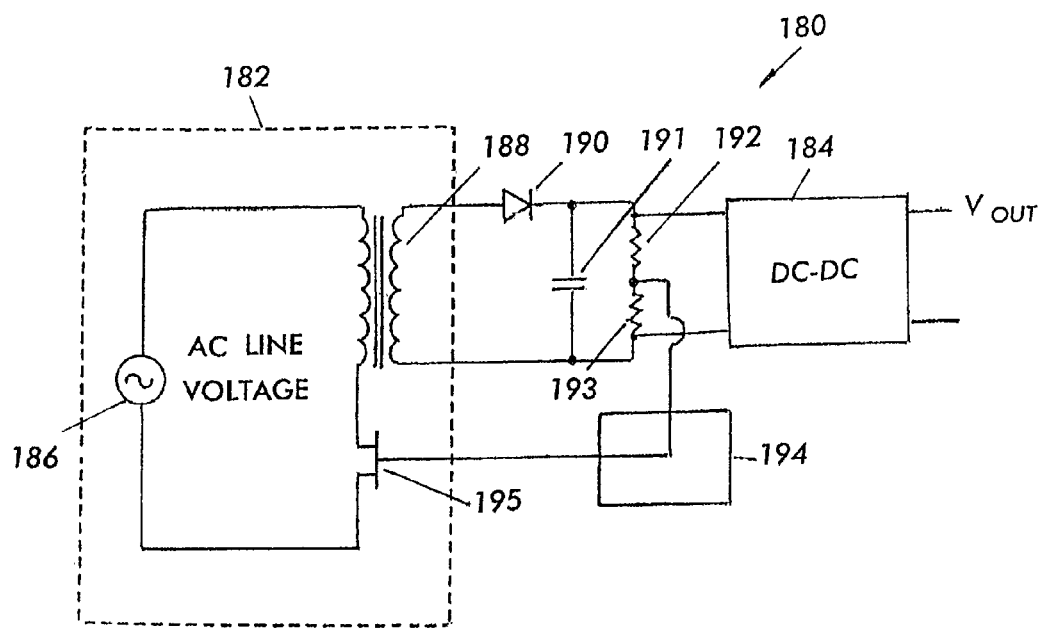

The charging circuit 80 comprises, as is well known, the mentioned control circuit 88, which repetitively turns on and off and also controls the duty cycle of a power switch 90 which allows just the right amount of electrical charge to pass to charge capacitor 92. The charging current is smoothed by an inductor 94 which charges the capacitor 92, maintaining the necessary low DC voltage at the output 96 of the charging circuit, which voltage is fed to the battery 32, via the blocking, forward biased diode 98. The output of the capacitor 96 is also fed back to the control circuit 88 to provide a closed loop for voltage control purposes. The diode 99 provides a current path for the back EMF of the inductor 94. The foregoing is just a representative charging circuit, and an example of the dozens of such circuits widely known in the art. The design can use a buck converter, various DC to DC schemes and operate at extremely high frequencies to reduce the dimension of a transformer (used for AC isolation) if needed. A DC to DC circuit portion can be provided before or after the transformer or even at both locations, as should be readily apparent to one skilled in designing low voltage, DC output power supplies. An example circuit is illustrated in FIG. 4B. This charging circuit 180 uses a forward converter 182, which generates a smaller DC voltage for the AC-DC converter 184. Thus, an AC source 186 drives a transformer 188 which is turned on and off at a high rate, for example, on the order of 100 kHz (or even at a megahertz rate) in order to realize a small sized transformer, generating a burst of AC power pulses which are rectified by the diode 190. The capacitor 191 stores a DC voltage across resistor dividers 192, 193. The voltage between the resistor dividers is tapped for a controller 194 which provides the high speed on/off control and drives the switching resistor 195, all in well known manner. This circuit provides the needed AC isolation and an implementation which can be realized with a transformer of a very small size owing to the high speed of operation thereof, again in well known manner.

The output current may be on the order of 600 mAmps, which is conventional for some mobile phones or only, say 300 mAmps, trading off speed of charging but gaining a still smaller charger circuit size.

The charger 50 may incorporate within a spare battery 32a (see FIG. 4A), and the switch 73 may be a double pole switch so operable that in one position current passing through diode 98 charges the phone battery 32 and in the other position the spare battery 32a. Thus, the spare battery may be used to charge the regular battery when AC power is unavailable (for example, in an automobile, on a bus or plane, etc.).

Figure 3B:
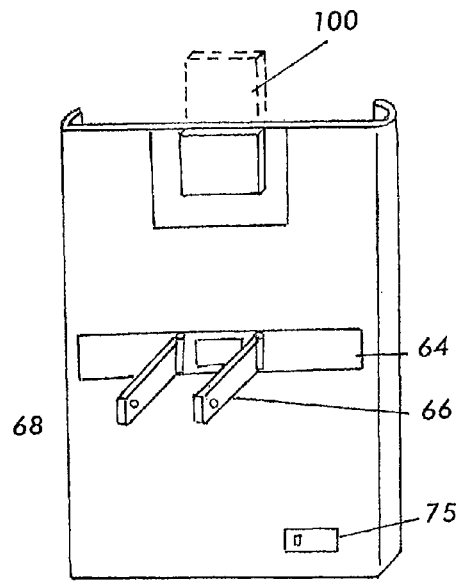
FIG. 3B shows the rear view of the charger jacket of FIG. 3A with the prongs in an operable position.

In accordance with a further feature, an optional USB connector 100 allows bypassing the charging circuit 80 to provide charging current via lines 102 that connect to charging connector 60, at nodes 104 and 106. See FIGS. 4 and 4A. In FIG. 3B, the USB connector is shown slidably integrated into a charger body.

Figure 5:
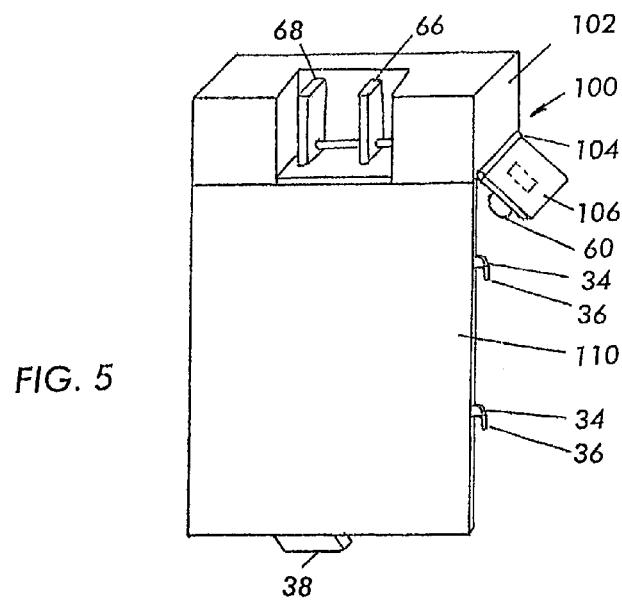
FIG. 5 shows an alternative embodiment of the charger jacket of FIG. 3, showing a charging body with an attachment panel which replaces the conventional cover of the mobile device shown in FIG. 2.

In alternatives to the jacket style charger 50, FIG. 5 shows a charger 100 which is designed not to increase the thickness of the cell phone, but rather, its length. The charging circuit 80 herein is housed in a small, rectangular body 102 which has approximately the same width and thickness as the mobile device 10 and which sits atop (or on the bottom) thereof. In the device 100 of this embodiment, the AC prongs 66, 68 can be fitted along the back thereof, as described previously, or owing to the greater thickness of the charger 100, can be embodied inside its body 102, as shown in FIG. 3D. Via a living hinge 104, a small plasticized ribbon 106 supports thereon the DC plug 60, which is precisely positioned so that it can be swung into the charging socket 18 of the mobile device 10. It will be readily recognized that the chargers herein would be designed in each instance to fit a particular style of mobile device, matching its particular width, length and thickness dimensions and the location of its charging port 18.

The charger 100 of FIG. 5 is designed to be connected to the cell phone 10 without at all grabbing on or obstructing the side panels. Herein, the charging circuit body 102 has a connecting panel 110 which in every respect is constructed to mimic the dimension, shape and function of the cell phone cover 24 of FIG. 2. It is also integral with and extends from the body 102 and supports it. Here, the mobile device cover 24 is removed and the extension panel 110 is inserted and attached to the cell phone's existing cover holding mechanism, inasmuch as the panel has the same tongues 34, 36 and catch 38 which allows it to be connected in such a manner that the rear of the cell phone is not obstructed in any way and the panel 110 also may have the openings for a camera lens or a flashlight, as typically found, for example, on a Blackberry® and other cell phone devices.

Figure 6:
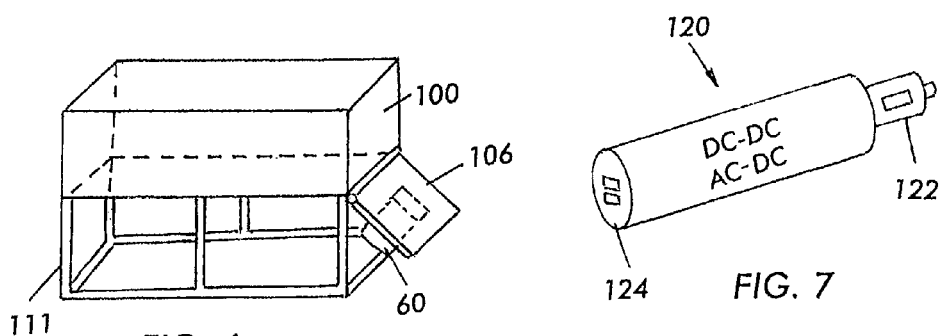
FIG. 6 shows a further charger circuit embodiment which, like FIG. 5, is provided along the top of the mobile device, so as to provide a longer cell phone and charger combination, while maintaining the thickness dimension of the mobile device.

In yet another embodiment, in lieu of the panel 110, a cage-like plasticized body 111, as shown in FIG. 6, is provided which allows the charger 100 to be slipped on the top of the cell phone with a latticework that basically blocks nothing requiring access by the cell phone user on the body of the mobile device 10.

Figure 8:
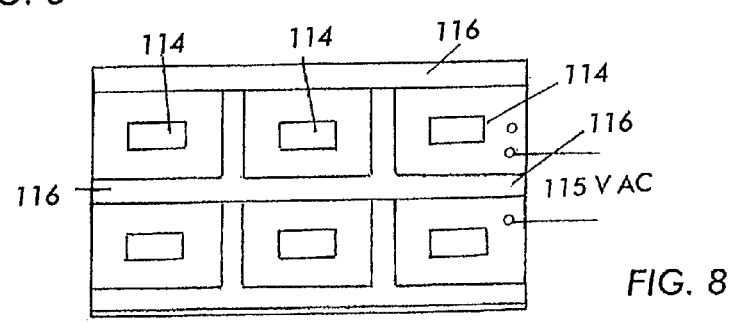
FIG. 8 shows a board layout for the invention, which also serves as a heat sync for dissipating energy.

In general, the charger styles described herein allow for the electrical components of the circuit 80 to be spaced over a substantial area of even as high as 50cm square. In order to achieve the thin profile of the jacket 50, it is intended herein that the circuit components, such as those shown in FIG. 4A, are especially configured to use flat components 114 and in many instances, for resistor, diode, particularly capacitors components to use several discrete components in parallel (or serial), in order to distribute the heat dissipation and reduce the thickness dimensions of each component while attaining the appropriate resistance, capacitance and heat disposition values. For example, a resistance of 100 ohms can be implemented as two resistors of 200 ohms each (or two 50 ohm serial resistors), where each resistor dissipates only one-half the generated heat. This is, for example, shown in FIG. 8, which shows the components to be small, flat and widely spaced. In addition, the internal jacket 50 can be lined with heat conducting metal paths 116, so that any heat generated within is more easily and efficiently spread over a greater area and more effectively dissipated.

Please note that the switch 72 shown in FIGS. 3A, 4A, allows the charger to be electrically disconnected from the charging socket 18 of the mobile device 10, to avoid any issue of the battery 32 discharging through the charger 50 during periods when the charger is not connected to an AC wall socket. This function can be provided by the aforementioned diode 98.

Figure 7:
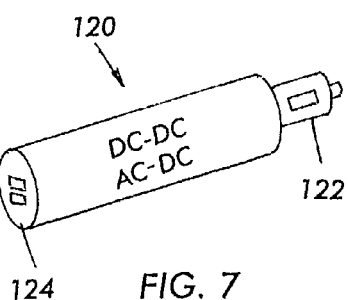
FIG. 7 shows an automobile charging accessory for the charger of FIGS. 3-6 of the present invention.

As a further accessory, FIG. 7 shows a plug-style DC to DC or a DC to AC converter circuit 120, the details of which are well known in the art, provided in a body that includes a plug 122 that fits the conventional 12 volt power plug in automobiles and which outputs at the other end thereof, its output voltage at a socket 124 which is indistinguishable from the conventional AC socket. Thus, leaving that plug inside one's automobile allows the cell phone to be simply inserted therein during driving, so maintaining the cell phone fully charged and/or charging it, if necessary. The body shape of the plug 120 may extend straight or be contoured so that the socket 124 extends toward the driver with the cell phone resting on top of the socket, for hands free operation during driving, if appropriate.

In general, the present invention describes a charger body in which the ratio of the body thickness dimension to the product of the length and width dimensions thereof is considerably lower than in the prior art. For example, the length, width and thickness of a prior art charger measuring, respectively, 6×4×2 centimeters yields a ratio of 0.083. Here, a charger body measuring 10×6×1 centimeters yields a ratio of 0.017. The inventors intend to encompass charger body styles where that ratio is equal to or less than 0.05.

In accordance with a further embodiment, the charging circuit 80 of FIG. 4A or a like circuit is embedded into a cell phone holder 200 which can be clipped to a person's clothing, typically a belt. See FIG. 9. The cell phone holder 200 has a first body component 202 which is pivotally attached to a clip 204 through a spring-biased pivot 206 with a contact point between holder body parts 202 and 204 at a bottom portion 208, whereby the holder can be clipped onto a belt of person, in well known manner. A round or oval, or even square catch 214 is attached to the holder body 202 via a projection 212 forming a hook 210 onto which the telephone which is provided with the previously described jacket 51 can be hooked by the jacket 51 being formed with a holding structure 53 with an opening 55.

The holder body 202 comprises within the charging circuit 80 which receives AC power via foldable AC prongs 66 and 68 (see FIG. 3E), further via AC wires 69 which pass through the pivot structure to the body 202.

The DC charging power is passed through the stem 212 and onto electrical contacts 214 formed on the catch 214. The electrodes 216 mate with similar electrodes 57 on the jacket 51 and thus, DC charging power is conducted via routing wires 59 to the charging plug 60, as previously described.

As in a prior embodiment, a USB connector 100 can be provided within the body 202 and slid out so that it can be connected directly to supply charging power to the electrodes 216 shown in FIG. 9A.

Using the embodiment of FIG. 9 through FIG. 10, the supporting cell phone belt holder 200 doubles as a case for a charging circuit. The basic arrangement of cell phone belt holder is described in greater detail in U.S. Patent Publication No. 2003/0000976, the contents of which are incorporated herein by reference in their entirety. As before, a telephone charger which is embedded in a holder is realized in a small size. For example, the body portion 202 might typically measure about 6 cm in length, 3 cm in width, and 1 to 1½ cm in thickness. The belt holder can be designed and optimized for clipping a wall panel inside a lady's handbag or in any carrying case, whereby it can be carried by men and ladies alike. This charger can also be used in an automobile by using the adapter previously described relative to FIG. 7.

With the present invention, a highly integrated charger having an appealing appearance which does not mar the body style of the cell phone and does not appreciably increase its dimensions, has been described. The device avoids the drawbacks of the prior art, which require users to lug around separate chargers, both for their automobiles and for home use in the manner originally described.

The foregoing description of the invention inherently embodies the following features and aspects, as well as others not previously explicated, as elaborated below.

Thus, in the preceding description, the charger 50, per se, has been described as a stand-alone device that can be secured to the electrical device, i.e., to the cell phone, by being clipped or fitted to it in various ways. Alternatively, as already mentioned, the charger itself can be integrated with the phone by forming or replacing its cover. However, it is inherent and implicit in the previous description, that the described charger can be physically integrated as to become an integral part of the very body of the portable device at the factory, so that it would not be separable by the end user from the phone. Nothing in the foregoing description needs to be altered to realize the mentioned embodiment, where the charger and the portable electronic device are integrated in a single housing. As mentioned, the portable device may be a phone, a music or video player, a PDA, a tablet, and the like, the main objective herein being that these phones, etc., which often have thicknesses on the order of about 10 mm, and even less, can be fitted with a charger that adds no more than a few millimeters to that thickness dimension, with the charger having A/C prongs that lie flat in the charger, so that the main body plane of the charger is substantially parallel to the main body plane of the portable device. In general, the charger 50 preferably has a substantially (meaning mostly) flat and thin rectangular body (with possibly rounded corners), with one surface that substantially matches the phone wall surface which it abuts. In other words, the thickness dimension is preferably substantially uniform. Naturally, deviations as by providing a small bulging section (or sections) is still to be deemed that the charger is substantially flat. Certainly, bulging over only 25 percent or less of the charger surface can be ignored. Also, the overall shape of the charger need not be rectangular as it could be oval, round, triangular etc. The side walls may be beveled or rounded.

Additional variations or aspects are possible, including the ones described below. Referring to FIGS. 11 and 12, shown herein in dashed lines are the AC prongs 68, 66 in their elevated positions, where they have been elevated out of the plane of the charger in order to allow them to be inserted into an A/C wall socket in one's home, office, and the like.

Figure 13:
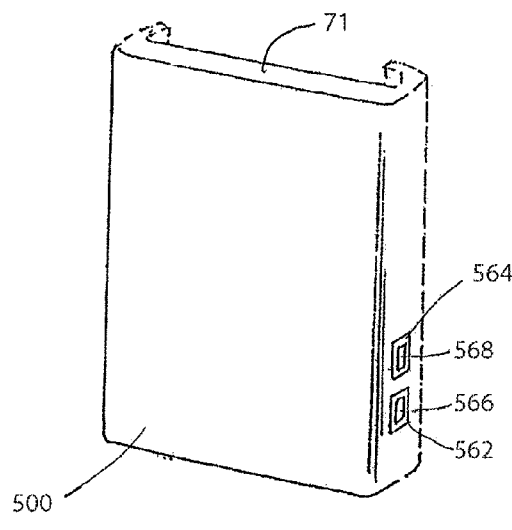
FIG. 13 is a perspective of a further embodiment for concealed flat lying A/C prongs ("flat prongs").
Figure 14:
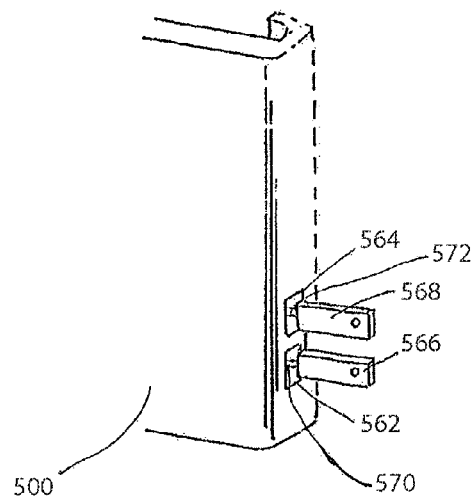
FIGS. 14 and 15 show different stages of the exposing of the flat prongs of FIG. 13.
Figure 15:
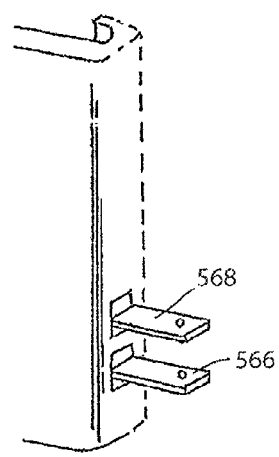

Referring to FIG. 13, the phone charger 500 has a main body thickness 71 in which, through one side end thereof, flat lying A/C prongs 568, 566 are capable of emerging from within the body 71 through respective interior channels 564, 562. Through a slider, for example, the slider 582 shown in FIG. 16, which can be slid to the right, and which is coupled to the prong 568, 566, these A/C prongs can be pushed out of the body 71, as shown in FIG. 14, in which state, the charger in the A/C prongs 568, 566 are in a position where they might be used in European-style A/C sockets, but not in the United States-style sockets. To that end, these prongs 568, 566 are mounted on a pivot axis 564, 562 which enable them to be rotated to the position shown in FIG. 15, and thereby make them usable in the United States-style A/C sockets. Interiorly, the prongs remain in contact with conductive contacts which route the AC signals to the circuitry shown in FIGS. 4 and 4A. Alternatively, the prongs may be oriented as in FIG. 15 while still within the body 71 or within the phone 10 (FIG. 1).

Figure 16:
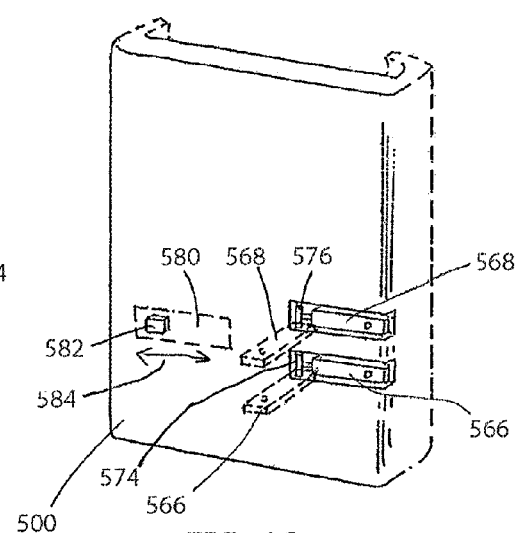
FIG. 16 is a perspective of yet another embodiment for flat prongs.

Referring to FIG. 16, here, the A/C prongs 568, 566 are not concealed within the body 71, but rather lie in open channels and each prong can be pivoted about its respective pivot axis 576, 574, and then turned to the position shown in dashed lines to achieve the ends of the present invention. As noted, the slider 582 can be used for that purpose. That slider can be moved partially inside a depression or cutout 580 in the body 71. The arrow 584 indicates the back and forth movement of the slider 582, which achieves the objectives of the present invention.

Figure 17:
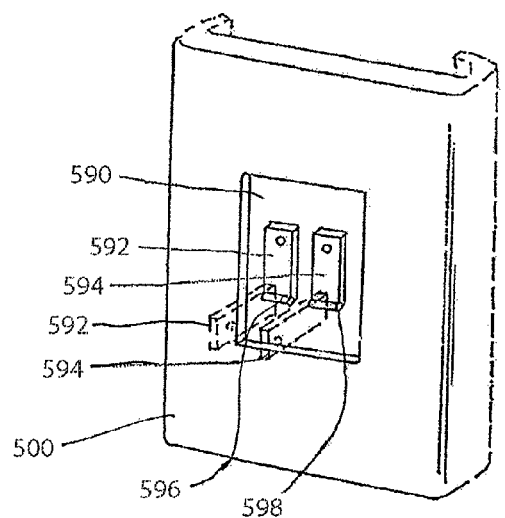
FIG. 17 is a still further embodiment of an arrangement of flat prongs.

Similar to the prior embodiments, in FIG. 17, the A/C prongs 592, 594 are located in a cutout 590 in the body 71, and can be pivoted about their respective pivot axes 596, 598 and then rotated to the position shown in the dashed lines to achieve the same end as described previously.

Figure 18:
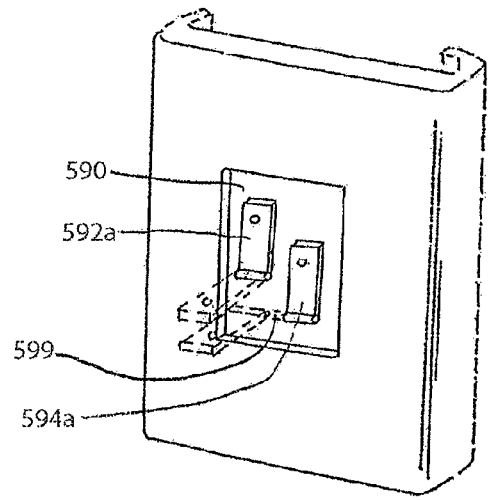
FIG. 18 is a still further embodiment of flat prongs.

In FIG. 18, the prongs 592a, 594a can be pivoted around their pivot axes and subsequently the bottom prong 592b can be slid to the left on its pivot axis 599, so it aligns with the upper A/C prong 590 as shown in dashed lines.

Figure 19:
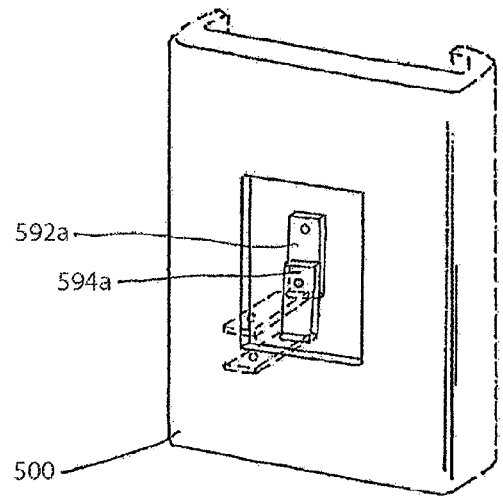
FIG. 19 is yet another embodiment for flat prongs.

In FIG. 19, the prongs 592b, 594b overlie one another and can be pivoted to the operational position as shown in dashed lines.

Various mechanisms can be deployed to raise and lower the mentioned prongs, including as shown in FIGS. 20-24.

Figure 20:
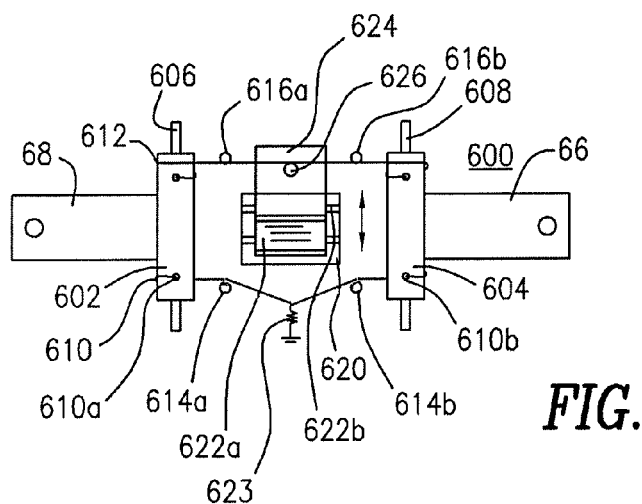
FIG. 20 is a diagram illustrating a slide switch mechanism for raising and lowering flat prongs.

Referring to FIG. 20, A/C prongs 68, 66 are respectively mounted to their respective pivoting bodies, each of which has pivoting pins 606, 608, which are mounted within a recess so that the pivoting bodies 602, 604 are capable of rotating, but not translating. A tight spring wire 610 has one end fixed to the pivot body 602 at 610a and the other end at 610b on the pivot body 604. The wire is spring-like, owing to which, it will constantly exert a strong counterclockwise pull on one pivot and a clockwise pull on the other, assuring that the prongs 68, 66 are always drawn or biased to lie flat in the body of the charger (in the plane of the paper). A similar wire 612 wound on the same axis and passing by pins 616a, 616b can be pushed up by a catch 626 located on a slider body 622, so that when the knob 620 is slid within the cutout 620, it will move up, pulling on the wire and working against the spring force of the wire 610, raise the prongs 68, 66 to extend perpendicularly to the plane of the charger. The knob 622a has a bottom detent which catches within a groove located on a groove 622b located as shown, allowing its position to hold against the force of the spring wire 610. If desired, the spring 610 can be also biased with physical spring 623 that pulls on it in the plane of the charger.

Figure 21:
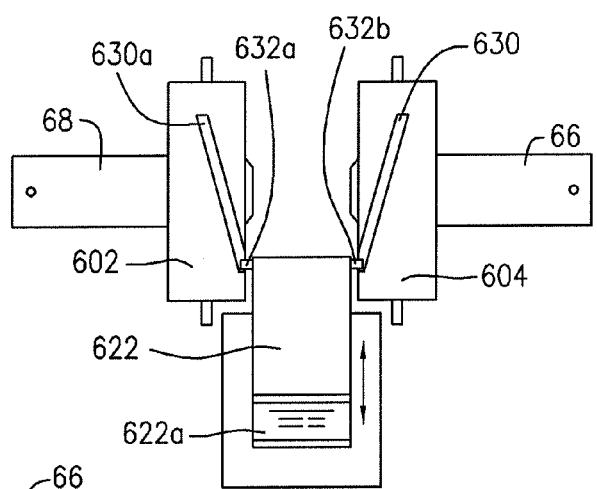
FIG. 21 is a further mechanism for raising and lowering flat prongs.

In the alternate embodiment of FIG. 21, the pivot bodies have inclined grooves 630a, 630b, respectively, in which pins 632a, 632b of the slider 622 can slide. When the slider body 622 is moved by pushing on the knob 622a, the pins 632a, 632b ride in the groove 630a, 630b and rotates the prong 68, 66 to the upright position. This embodiment has the advantage that it does not require any metallic springs.

Figure 22:
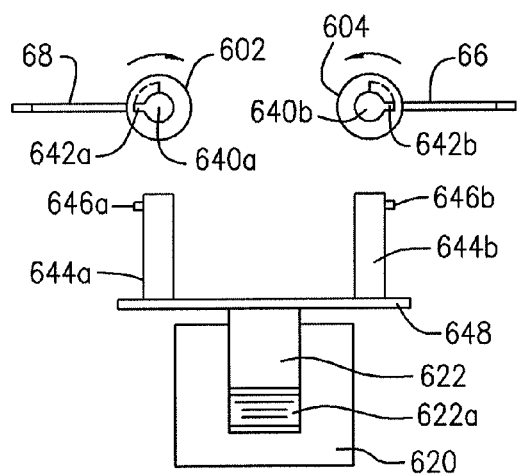
FIG. 22 is still another embodiment for raising and lowering flat prongs.

In FIG. 22, the grooves are formed inside these bodies 640a, 640b in which are internally formed the inclined grooves 642a, 642b, whereby when the prongs 644a, 644b associated with the slider 622 ride inside within the bodies of the pivots, they will rotate them in a self-evident manner. The two slider pins 644a, 644b are connected by joining bar 640a which is connected in-turn to the slider body 622, and so uniformly turning the prongs.

Figure 23:
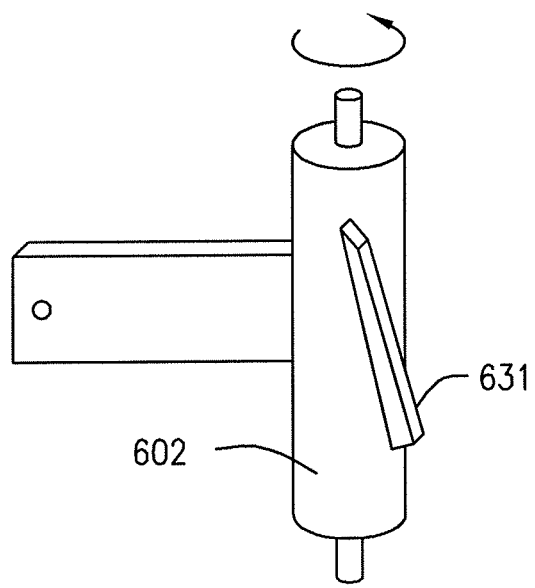
FIG. 23 is a still further mechanism for raising and lowering flat prongs.

In FIG. 23, each pivot, for example, the pivot body 602, can have instead of a groove, a protruding catch 631 that is inclined to the axis or the body 602, as shown. The companion pivot body has a similar protrusion which extends in an opposed orientation. Therefore, when the slide body 622, having the pins 632a, 632b, engages these projections 631, it will inherently rotate the bodies 602, 604 to raise the associated prongs from their normally stowed position.

Figure 24:
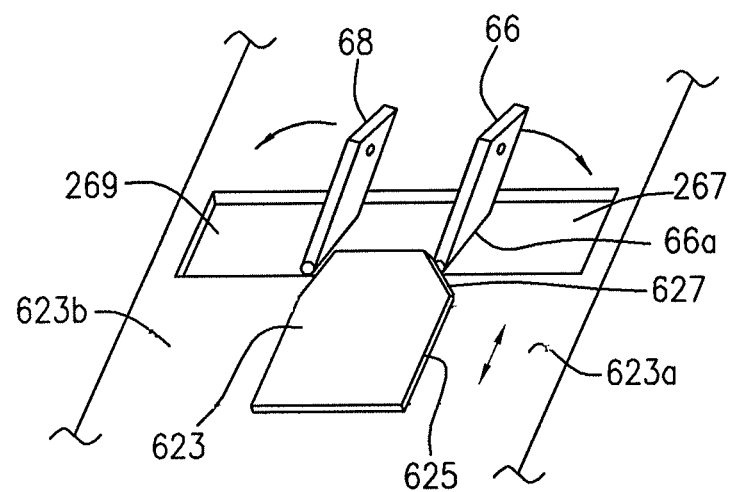
FIG. 24 is yet another mechanism for raising and lowering flat prongs.

Lastly, in FIG. 24, prongs 68, 66 are biased internally to stand upright. When the slider body 625 is pushed between the prongs, its initial narrowed body portion 627 begins to pivot the prongs to the right and to the left, respectively, until the wider body portion 623 of the slider overlies the pins (partly or totally) and keeps them down. Thus, the wider portion of the slider can be as wide as the extent of the prongs and totally cover them, so that no portion of the prongs is visible when the slider has been pushed sufficiently forwardly, providing improved aesthetics.

Figure 25:
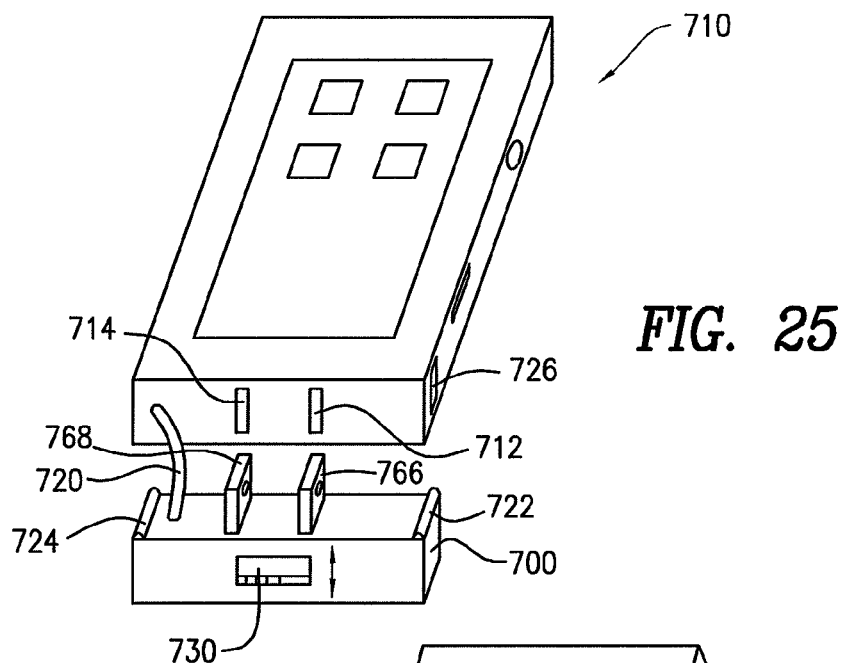
FIG. 25 perspectively illustrates another mechanism for a small body charger for a mobile electronic device.

In a further embodiment of the invention, and as illustrated in FIG. 25, the charger 700 has prongs 766, 768 that can be inserted into a new type of a phone 710 that has sockets 712, 714 into which the charger 700 can be inserted so as to attach and integrate the phone and the charger into a single body. To charge the telephone, the body 700 is pulled out and rotated into an A/C socket and, thus, is able to provide charging power through a cable 720 which is associated with the telephone 710. If desired, in this embodiment too, the prongs 766, 768 can lie flat and the charger 700 located under the phone is attached to the phone via snaps 722, 724 that fit in grooves 726 formed on the phone body itself. Regardless, when the charger is not in use, it has the appearance of a single phone device whereby it is simply an extension of the phone itself. If desired, a USB port-style or an Apple-style connector 730 is provided within the charger 700, which can be slid, and thereby inserted into the charging slot of the phone, dispensing with the need for the physical cable 720.

In the description provided above relative to several of the Figures, including FIGS. 11-19, it should be noted that the shape of the prongs can be round, to fit the requirement of A/C prongs in certain countries of the world. Note further that the present invention can be used with foldable phones. In a further embodiment of the invention, the bottom one-third to one-half of the extension of each of the prongs 66, 68 can be coated with an insulating material 66a (FIG. 24), whereby even if one were to stick very slim fingers between the back of the charger when it is inside an A/C wall socket, he/she would not be able to touch any prong surface which is "hot". Preferably, only the outside surface of the prong is coated, and not the inside surfaces of the prongs which face each other.

Still further, in FIG. 3, a charging connector 60 that is flexibly mounted is shown. However, that connector 60 can be configured to point inwardly, so that it fits directly into socket on the phone. Alternatively, the connector 60 can be provided on the bottom panel in FIG. 3, pointing upwardly, so that a telephone can be slid through the top and directly connected to the charger, particularly when the phone is an iPhone®, where the connecting plug is at the bottom of the phone.

Figure 27:
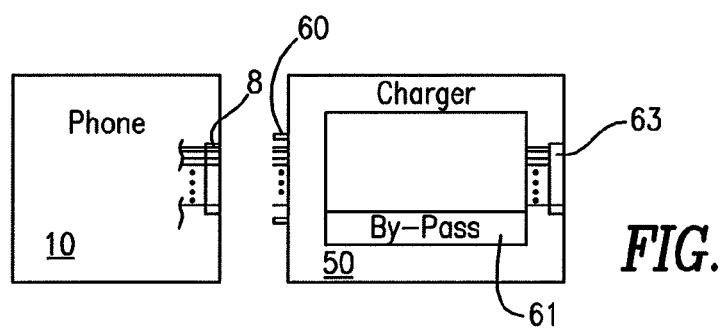

The charger of the present invention can be also implemented so that the charger provides a plug on the inside, which allows connecting to the input connector of the phone itself through the body of the charger. Thus, when the charger is not plugged into the A/C socket, the connector allows access so that all the phone input lines are accessible from the outside straight through the charger body. For example, with reference to FIG. 27, the invention provides a system and mechanism whereby when the charger 50 has its interface connector 60 coupled to the input connector 8 of the phone 10, the user's access to the phone connector 8 is physically blocked. However, in accordance with the present invention, the bypass arrangement in circuit 61 allows the input connector 63 in the charger 50, which is constructed to be a perfect replica of the connector 8 allows the user to couple signals through the connector 63 to the phone connector 8 via the action of the bypass circuit 61. For example, the signal lines (not necessarily including the power charging lines) may flow straight through from the connector 63 to the connector 8 when the charger is connected to the phone. Alternatively, a multiplexer may provide the choice based on the position of a switch (not shown). The charger itself may contain a local, long-life battery for providing this functionality.

Figure 26:
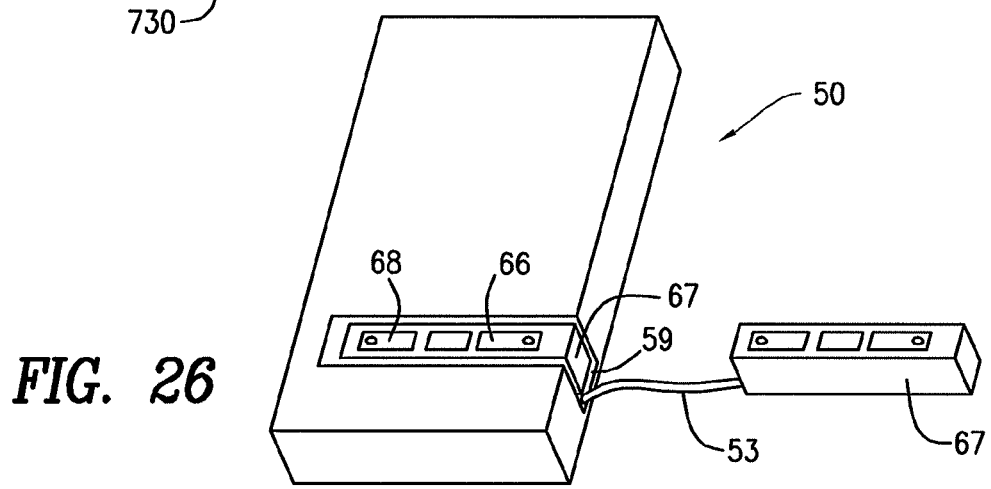
FIG. 26 perspectively illustrates another charger embodiment for a phone.

In FIG. 26, the folded A/C prongs 66, 68 are located in a groove 59 within the body of the charger 50 or the phone 10 and can be slid out and then opened to charge the phone with the prong body 67 being tethered by an A/C cord 55 to the charger or to the phone, as shown. The A/C cord 55 may be wound on an internal spiral metal spring, so that it easily pull back into the body.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A mobile device charger, comprising:
    a main body having embedded therein a charging circuit configured to receive a line AC voltage and convert it to a DC voltage suitable for charging the mobile device;
    AC prongs foldable into the body in a stowed position and configured to be pivoted out of the main body in an operable position;
    a connection structure formed integrally with the main body, the connection structure extends from the main body and is configured to grasp onto and hold the charger secured to the mobile device;
    a charger plug integrally formed with the charger and located on the charger such as to allow the charger plug to be inserted into a charging port of the mobile device, the charger being so configured as to enable it to be connected physically and electrically to the mobile device during the use of the mobile device and to allow the AC prongs to be positioned in the operable position for charging of the mobile device, while the charger is physically integrated with the mobile device; and
    a slider body actuatable by the user and configured as a slidable cover which, in one sliding position, exposes the AC prongs and which, in a second sliding position, substantially covers the AC prongs with the AC prongs being flat on their wider sides.

2. The charger of claim 1, wherein the main body is a generally flat body with a substantially uniform thickness dimension and having length and width dimensions, with the thickness dimension of the main body being not larger than one quarter of either one of the length or width dimension.

3. The charger of claim 1, wherein the main body is a generally flat body with a substantially uniform thickness dimension and with length and width dimensions, the ratio of the thickness dimension to the product of the length and width dimensions being less than or equal to 0.05.

4. The charger of claim 1, wherein the thickness dimension is less than 12 mm.

5. The charger of claim 1, wherein the connection structure comprises left and right resilient holding panels which extend generally away from a plane in which the main body lies and which are spaced apart and positioned to grasp sidewalls of the mobile device.

6. The charger of claim 5, wherein the side panels have substantial cutouts formed therein in positions that avoid obstructing any electrical connections or switches of the mobile device.

7. The charger of claim 1, wherein the slider body is further configured to controllably pivot the AC prongs in and out of their stowed position by sliding action of said slider body.

8. The charger of claim 1, wherein the AC prongs are configured to be positioned flush with an outer surface of a back side of the main body in the stowed position.

9. The charger circuit of claim 1, wherein the AC prongs are formed with a detent mechanism that maintains the operable position of the prongs.

10. The charger circuit of claim 1, wherein each said AC prong is pivotable about a respective pivot body and each pivot body is formed with a respective inclined projection or channel and wherein the slider body comprises a complementary projecting element which inter-engages with said projecting element or channel in a configuration whereby a sliding action of the slider body causes said pivot bodies to rotate and raise or lower said AC prongs.

11. The charger circuit of claim 1, wherein the main body has a width and a thickness dimension which matches a corresponding thickness and width dimensions of the mobile device and wherein the connection structure integrally extends from the main body and has a shape and dimensions which match corresponding shape and dimensions of a cover portion of a mobile device which is removed, allowing the connection structure to connect to the mobile device in the same manner and mimicking the cover of the mobile device.

12. The charger of claim 1, wherein each of said AC prongs has a respective pivoting body, each said pivoting body having a hollow interior and a channel within which can be engaged by a projection element of said slider body in a manner which causes sliding action of said slider body to turn each said pivot body.

13. The charger of claim 1, wherein the charger circuit is comprised of circuit components which are generally flat and widely distributed over a space of less than 25 cm square with a body thickness that does not exceed 7 mm.

14. The charger of claim 1, further comprising a USB connector coupled to the charger plug.

15. A mobile device charger, comprising:
    a main body having embedded therein a charging circuit configured to receive a line AC voltage and convert it to a DC voltage suitable for char in the mobile device;
    AC prongs foldable into the body in a stowed position and configured to be pivoted out of the main body in an operable position;
    a connection structure formed integrally with the main body, the connection structure extends from the main body and is configured to grasp onto and hold the charger secured to the mobile device;
    a charger plug integrally formed with the charger and located on the charger such as to allow the charger plug to be inserted into a charging port of the mobile device, the charger being so configured as to enable it to be connected physically and electrically to the mobile device during the use of the mobile device and to allow the AC prongs to be positioned in the operable integrated with the position for charging of the mobile device, while the charier is physically mobile device; and
    an operating knob is actuatable by the user and configured to raise the AC prongs from the stowed position, and
    wherein the AC prongs are positioned and configured to fold in opposite directions.

* * * * *

UNITED STATES PATENT AND TRADEMARK OFFICE
CERTIFICATE OF CORRECTION

| | | |
|---|---|---|
| PATENT NO. | : 8,712,482 B2 | Page 1 of 1 |
| APPLICATION NO. | : 13/546307 | |
| DATED | : April 29, 2014 | |
| INVENTOR(S) | : Yeoshua Sorias et al. | |

It is certified that error appears in the above-identified patent and that said Letters Patent is hereby corrected as shown below:

On the Title Page, Item (60) should read

Related U.S. Application Data

(60)  Provisional application No. 61/432,050, filed on January 12, 2011

In the Specification:
Please replace paragraph [0001] with the following rewritten paragraph:

CROSS-REFERENCE TO RELATED APPLICATIONS
[0001] The present application is a continuation-in-part and claims the benefit of Application No. 13/348,066 filed on January 11, 2012, which claims the benefit of U.S. Provisional Patent Application No. 61/432,050 filed on January 12, 2011, entitled DETACHABLY INTEGRATED BATTERY CHARGER FOR MOBILE CELL PHONES AND LIKE DEVICES. The contents of which Application No. 13/348,066 are incorporated herein by reference.

Signed and Sealed this
First Day of July, 2014

Michelle K. Lee
*Deputy Director of the United States Patent and Trademark Office*